United States Patent
Kostyushko et al.

(10) Patent No.: US 10,826,919 B2
(45) Date of Patent: Nov. 3, 2020

(54) METHODS AND CLOUD-BASED SYSTEMS FOR PROTECTING DEVICES FROM MALWARES

(71) Applicant: Acronis International GmbH, Schaffhausen (CH)

(72) Inventors: Alexey Kostyushko, Moscow (RU); Vladimir Strogov, Moscow (RU); Serguei Beloussov, Costa Del Sol (SG); Stanislav Protasov, Moscow (RU); Anastasia Pereberina, Moscow (RU); Nikolay Grebennikov, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 169 days.

(21) Appl. No.: 16/173,405

(22) Filed: Oct. 29, 2018

(65) Prior Publication Data
US 2020/0137085 A1    Apr. 30, 2020

(51) Int. Cl.
*H04L 29/06* (2006.01)
*G06F 21/56* (2013.01)
*G06F 21/53* (2013.01)

(52) U.S. Cl.
CPC .......... *H04L 63/1416* (2013.01); *G06F 21/53* (2013.01); *G06F 21/562* (2013.01); *G06F 21/566* (2013.01)

(58) Field of Classification Search
CPC ...... H04L 63/1416; H04L 63/14; G06F 21/53
See application file for complete search history.

(56) References Cited

U.S. PATENT DOCUMENTS

| | | | |
|---|---|---|---|
| 7,941,813 B1 * | 5/2011 | Protassov | G06F 9/4411 710/33 |
| 8,756,696 B1 * | 6/2014 | Miller | H04L 63/14 709/247 |
| 9,274,823 B1 * | 3/2016 | Koryakin | G06F 9/45558 |
| 2002/0046275 A1 * | 4/2002 | Crosbie | G06F 21/552 709/224 |
| 2007/0283192 A1 * | 12/2007 | Shevchenko | H04L 63/1408 714/39 |
| 2008/0222717 A1 * | 9/2008 | Rothstein | H04L 63/1416 726/14 |
| 2015/0047032 A1 * | 2/2015 | Hannis | H04L 63/1416 726/23 |
| 2017/0279842 A1 * | 9/2017 | Jover | H04W 12/12 |
| 2020/0137085 A1 * | 4/2020 | Kostyushko | G06F 21/562 |

* cited by examiner

*Primary Examiner* — Ponnoreay Pich
(74) *Attorney, Agent, or Firm* — Arent Fox LLP; Michael Fainberg

(57) ABSTRACT

Disclosed herein are systems and method for protecting an endpoint device from malware. In one aspect, an exemplary method comprises performing, by a light analysis tool of the endpoint, a light static analysis of a sample, terminating the process and notifying the user when the process is malware, performing light dynamic analysis when the process is not malware based on the light static analysis, when the process is clean based on the light dynamic analysis, enabling the process to execute, when the process is malware, terminating the process and notifying the user, and when the process is suspicious pattern, suspending the process, setting a level of trust, sending the sample to a sandbox, terminating the process and notifying the user when the process is a malware based on received final verdict, enabling the process to resume executing when the process is determined as being clean based on the final verdict.

20 Claims, 9 Drawing Sheets

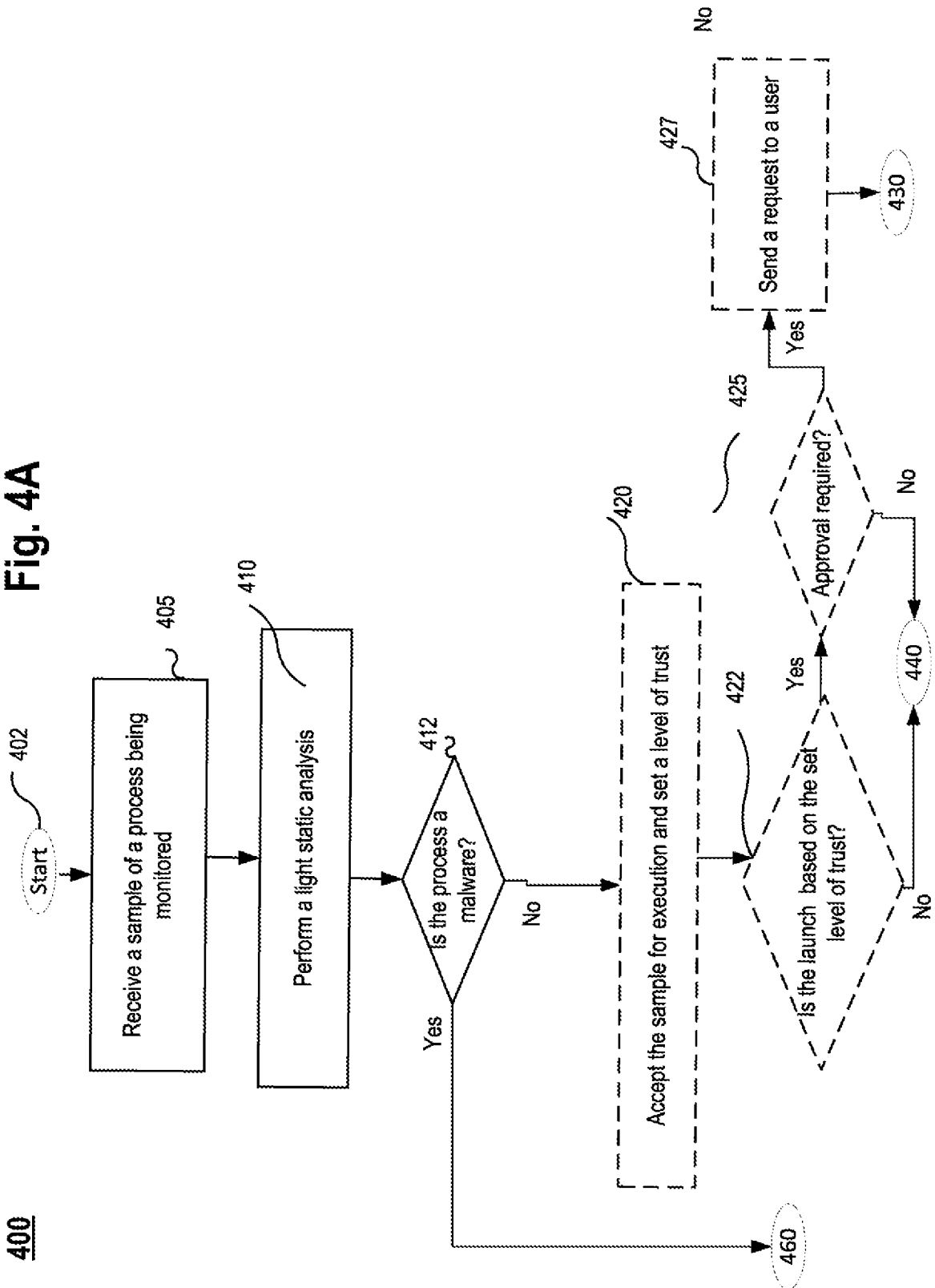

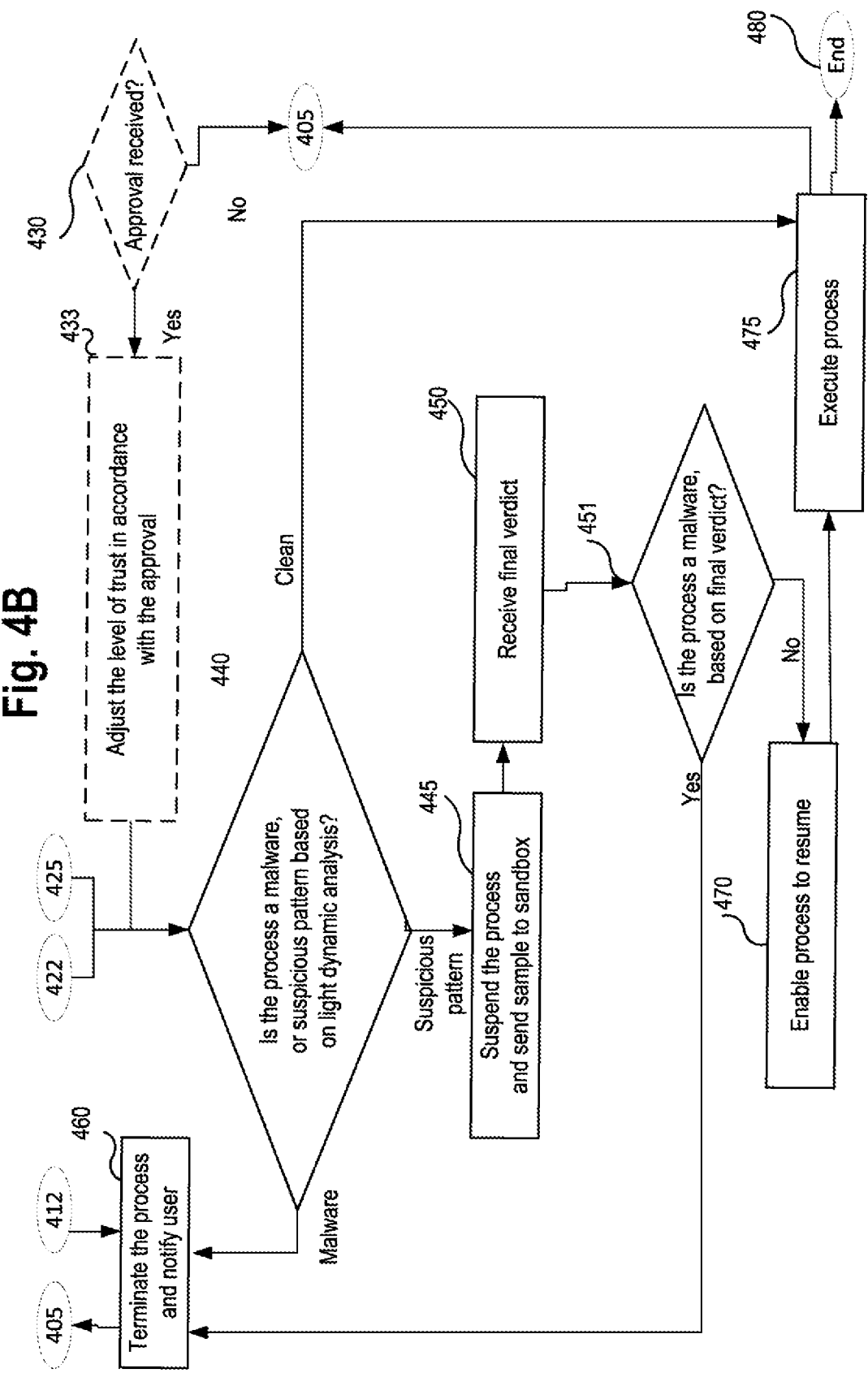

_US 10,826,919 B2_

METHODS AND CLOUD-BASED SYSTEMS FOR PROTECTING DEVICES FROM MALWARES

FIELD OF TECHNOLOGY

The present disclosure relates to the field of data and endpoint device security, and, more specifically, to systems and methods for protecting devices from malwares—thereby providing data security.

BACKGROUND

Modern communications devices, e.g., smartphones, are able to transmit, receive and store vast amount of valuable user data. These devices are routinely being used to access financial services, access health care records, share videos, photos, and the like. Unauthorized entities may attempt to access the user data.

One approach to protect the data is to implement a malware detection software in the user device and update the software periodically. However, monitoring and analyzing activities on the user device requires a large amount of resources and causes performance degradation. Moreover, the depth of the analysis needs to be balanced with the need for non-interference with other software. For example, too much interference may cause other software on the device to fail or cause the user experience to be disrupted. When such software failures or degradations occur, often, the troubleshooting includes turning off firewalls and antivirus (anti-malware) software on the device. In addition, when an analysis is thorough, another antivirus software may consider the activities performed for the purpose of the analysis as "suspicious activities." Therefore, a cybersecurity service provider may need to perform deep analysis only in a laboratory environment, e.g., in a sandbox. The sandbox enables the analysis to be performed without the need to protect user data. The malware may be detected after performing an unrecoverable action. Moreover, since all user actions in a sandbox are emulated by a test server via scripts, they are intentional. In contrast, in a normal environment, an action may be due to a user request or due to an autonomous program behavior. The sandbox provides an environment that allows for a controlled deep analysis. However, events that are detected by an analysis at the endpoint device and events that are detected by the deep analysis in the sandbox are separate and are addressed independently.

Therefore, there is a need to improve data security an endpoint device in an efficient manner, e.g., without affecting the performance of the endpoint device, interfering with other software loaded on the endpoint device, and while taking into account analysis made by anti-malware software implemented on the endpoint device. Moreover, there is a need to bind the results of the analysis in the endpoint device with the results of the analysis in the sandbox and improve the detection mechanisms.

SUMMARY

Aspects of the disclosure relate to the field of cloud-based malware analysis for protecting endpoint devices in accordance with a machine learning algorithm.

In one exemplary aspect, a method for protecting an endpoint device from a malware is implemented in the endpoint device comprising a processor, the method comprising: performing, by a light analysis tool of the endpoint device, a light static analysis of a received sample of a process being monitored, terminating the process and notifying the user when the process is determined as being a malware based on the light dynamic analysis, performing, by the light analysis tool of the endpoint device, a light dynamic analysis of the received sample when the process is not determined as being a malware based on the performed light static analysis, when the process is determined as being clean based on the light dynamic analysis, enabling the process to execute on the endpoint device in accordance with a policy, when the process is determined as being a malware based on the light dynamic analysis, terminating the process and notifying the user, and when the process is determined as being a suspicious pattern based on the light dynamic analysis, suspending the process, setting or adjusting a level of trust for the sample, sending the sample to a sandbox with a request for a final verdict, receiving the final verdict, terminating the process and notifying the user when the process is determined as being a malware based on the received final verdict, enabling the process to resume executing on the endpoint device in accordance with the policy when the process is determined as being clean based on the received final verdict.

According to one aspect of the disclosure, a system is provided for protecting an endpoint device from a malware, the system comprising at least one processor configured to: perform, by a light analysis tool of the endpoint device, a light static analysis of a received sample of a process being monitored, terminate the process and notify the user when the process is determined as being a malware based on the light dynamic analysis, perform, by the light analysis tool of the endpoint device, a light dynamic analysis of the received sample when the process is not determined as being a malware based on the performed light static analysis, when the process is determined as being clean based on the light dynamic analysis, enable the process to execute on the endpoint device in accordance with a policy, when the process is determined as being a malware based on the light dynamic analysis, terminate the process and notify the user, and when the process is determined as being a suspicious pattern based on the light dynamic analysis, suspend the process, set or adjust a level of trust for the sample, send the sample to a sandbox with a request for a final verdict, receive the final verdict, terminate the process and notify the user when the process is determined as being a malware based on the received final verdict, enable the process to resume executing on the endpoint device in accordance with the policy when the process is determined as being clean based on the received final verdict.

In one exemplary aspect, a non-transitory computer-readable medium is provided storing a set of executable instructions thereon for protecting an endpoint device from a malware, including instructions for performing, by a light analysis tool of the endpoint device, a light static analysis of a received sample of a process being monitored, terminating the process and notifying the user when the process is determined as being a malware based on the light dynamic analysis, performing, by the light analysis tool of the endpoint device, a light dynamic analysis of the received sample when the process is not determined as being a malware based on the performed light static analysis, when the process is determined as being clean based on the light dynamic analysis, enabling the process to execute on the endpoint device in accordance with a policy, when the process is determined as being a malware based on the light dynamic analysis, terminating the process and notifying the user, and when the process is determined as being a suspicious pattern based on the light dynamic analysis, suspending the process, setting or adjusting a level of trust for the sample, sending the sample to a sandbox with a request for a final verdict, receiving the final verdict, terminating the process and notifying the user when the process is determined as being a malware based on the received final verdict, enabling the process to resume executing on the endpoint device in accordance with the policy when the process is determined as being clean based on the received final verdict.

In one aspect, the policy is based on a level of trust, and the enabling of the process to execute on the endpoint device comprises: determining whether the level of trust is above a predetermined threshold, when the level of trust is above the predetermined threshold, executing the process, and when the level of trust is at or below the predetermined threshold, requesting for an approval to execute the process and executing the process only when the approval is received.

In one aspect, the light static analysis is performed by checking the sample against hashes and signatures of known malwares, and the light dynamic analysis is performed by collecting events of Type A without invasive techniques and analyzing the collected events of Type A to determine if the process is a malware, a suspicious pattern or clean. In one aspect, the determination of whether the process is a suspicious pattern is based on a preliminary verdict by a correlation analyzer of the light dynamic analysis tool.

In one aspect, the light dynamic analysis comprises: performing on-execution monitoring of the collected events of Type A, and analyzing to detect a malware or a suspicious pattern.

In one aspect, the setting or adjusting reduces the level of trust for the sample when the suspicious pattern is detected. In one aspect, the light dynamic analysis further comprises: adjusting one or more of: a frequency of collecting the events of Type A and a depth of the light dynamic analysis based on the adjustment of the set level of trust.

In one aspect, the final verdict is determined by a deep dynamic analysis tool of a server of the sandbox by: collecting events of Types A and B for the sample, and analyzing the collected events of Type B using one or more detection models of the deep dynamic analysis tool to detect malwares, the final verdict being indicative of whether the process is a malware or clean based on a deep dynamic analysis of the events of Type B.

In one aspect, the method further comprises: sending, by the server of the sandbox, the events of Types A and B and the final verdict to a correlator, wherein the correlator correlates the collected events of Types A and B, for events of Type A that are correlated with events of Type B used to detect malwares, creates suspicious patterns of events of Type A, and updates malware detection models of one or more endpoint devices and one or more servers of the sandbox based on results of the correlation. In one aspect, the updating includes at least distributing the created suspicious patterns to the one or more endpoint devices and the one or more servers of the sandbox, the endpoint device being protected from the malwares being one of the one or more endpoint devices to which the created suspicious patterns are distributed.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4A illustrates steps 402-427 of a flow diagram of a method for detecting malwares by an endpoint device in accordance with aspects of the present disclosure.

FIG. 4B illustrates steps 430-480 of a method for detecting malwares by an endpoint device in accordance with aspects of the present disclosure.

DETAILED DESCRIPTION

Exemplary aspects are described herein in the context of a system, method, and computer program product for malware analysis for protecting endpoint devices over cloud-based networks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
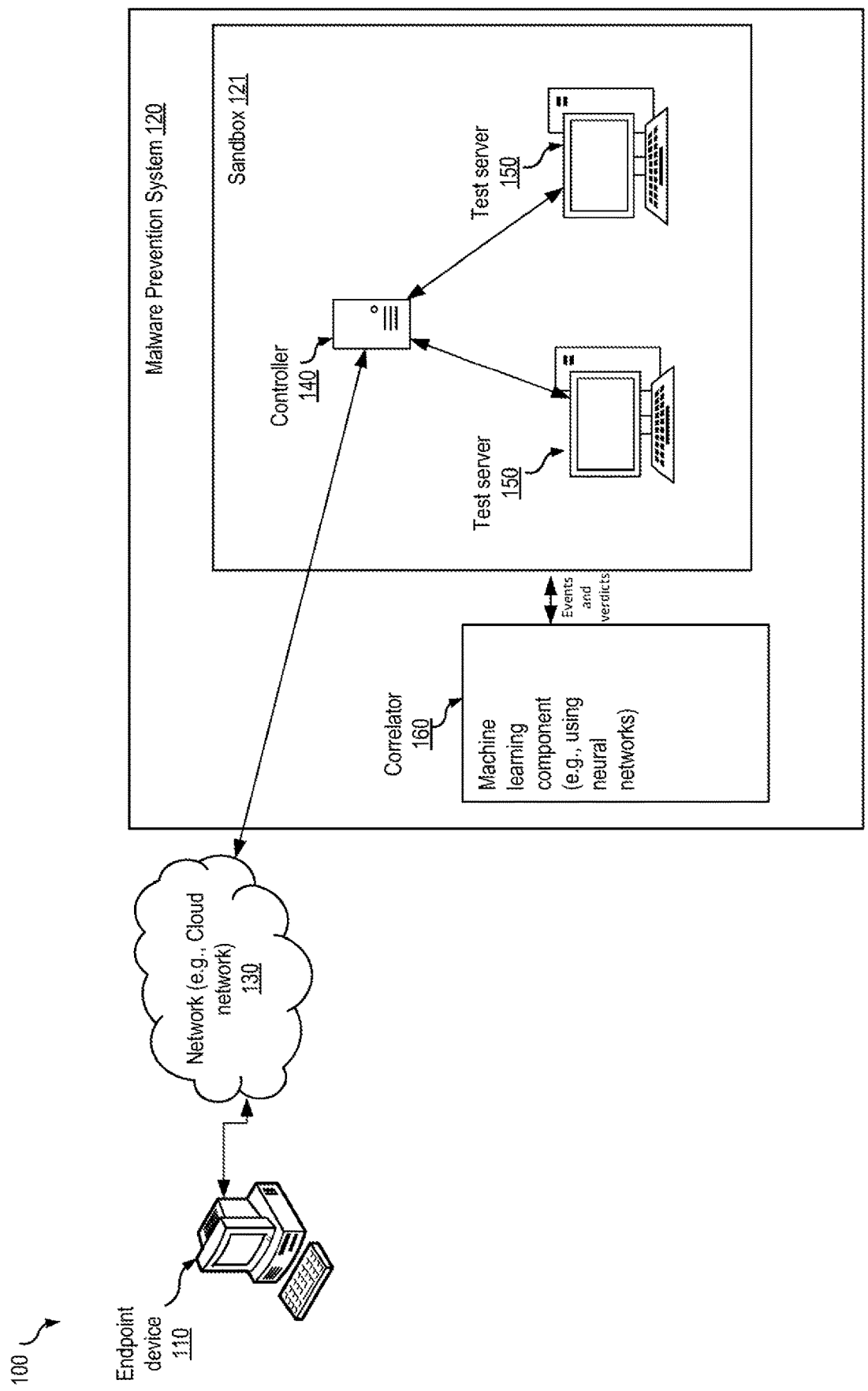
FIG. 1 is a block diagram illustrating an exemplary network for detecting malwares in accordance with aspects of the present disclosure.

FIG. 1 is a block diagram illustrating an exemplary network 100 for detecting malwares in accordance with aspects of the present disclosure. The network 100 comprises an endpoint device 110 communicating with a cloud-based malware prevention system 120 via a network 130, e.g., a cloud network or any other standard network used to enable endpoint devices to transmit and receive data.

In one aspect, the endpoint device 110 comprises an internet capable computer or hardware device on a TCP/IP network (desktop computer, laptop, smartphone etc.) intended for use by a logged user with user data to be protected from malware, or an internet capable computer device on a TCP/IP network (server) intended for providing services to remote users. In both cases, the endpoint device 110 contains valuable data and software that performs valuable workload.

Figure 7:
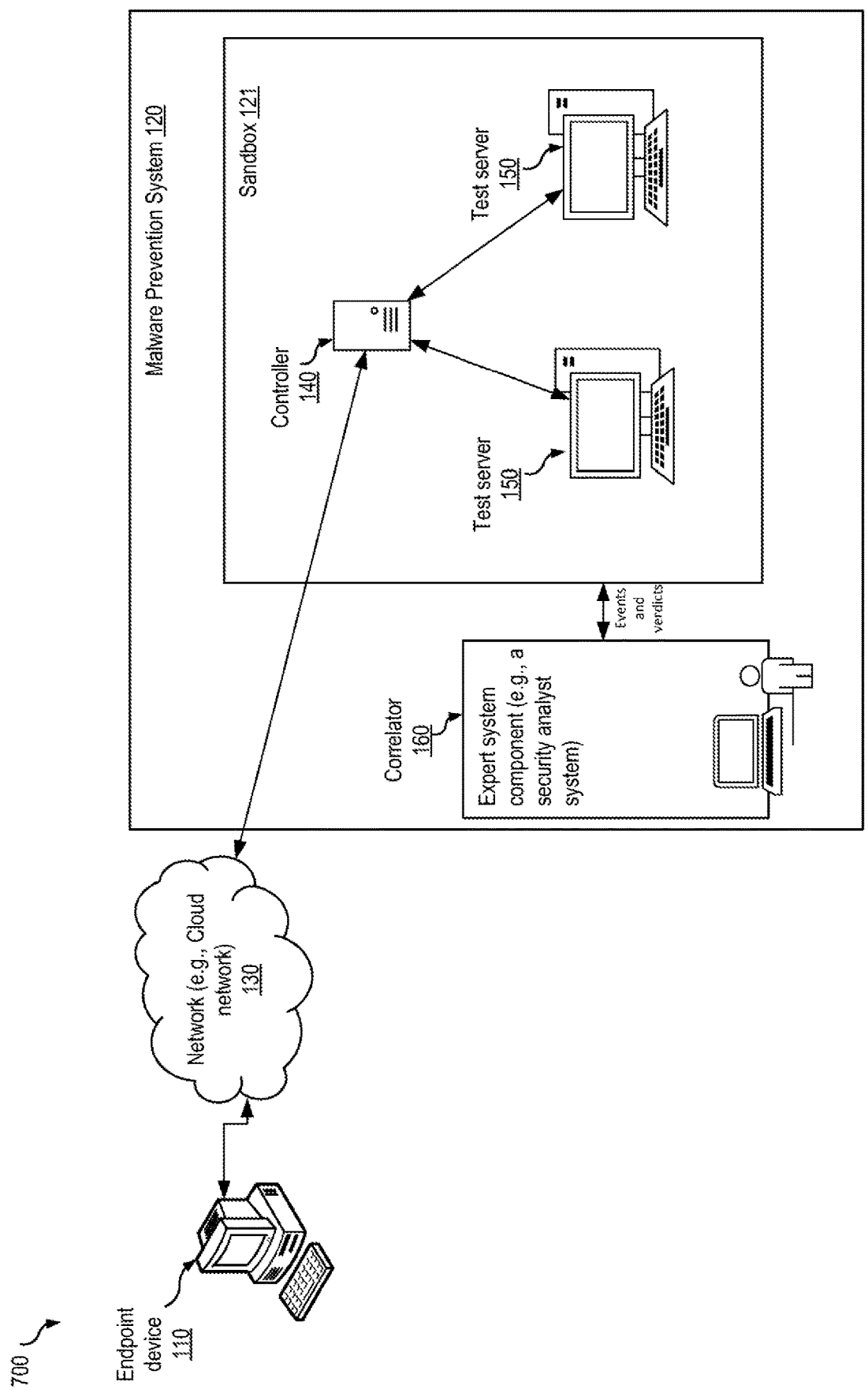
FIG. 7 is a block diagram illustrating an exemplary network for detecting malwares in accordance with aspects of the present disclosure

The malware prevention system 120 includes: a sandbox 121 and a correlator 160. The sandbox 121 includes a controller 140 and one or more test servers 150. The correlator 160 is a component that correlates events detected by various malware detection tools. The correlator 160 may comprise a machine learning component (as shown in FIG. 1) or an expert system component (as shown in FIG. 7). The expert system component may also be referred to as security analyst system. The machine learning of FIG. 1 may be facilitated using neural networks, which are a group of algorithms used for machine learning that model the data using graphs of artificial neurons (much like neurons of a brain).

In order to clearly illustrate the teachings, concepts and definitions used for descriptions of analysis tools used for malware detection are first provided.

In one aspect, malwares may be detected based on traditional antimalware techniques or next generation antimalware techniques. The traditional antimalware techniques are based on searches for malware signatures in databases. The databases are updated by security analysts. The update of the databases may be performed either directly or through a human-machine expert system that is powered by some tools and/or automation. Since the traditional approach is based on searches in databases, the detection technique is effective only for known threats. As such, unknown threats (e.g., zero day attacks) are undetectable via traditional antimalware techniques.

The next generation antimalware techniques are based on: execution of codes, behavioral analysis, and machine learning. Unlike the traditional antimalware techniques, the next generation antimalware techniques are suitable for detecting unknown threats. The next generation antimalware techniques may be used in conjunction with "honey pots". A "honey pot" refers to a storage (e.g., a database) used for placing objects of interest (e.g., user files, bitcoin wallets, credit card data, identity data, etc.). Malware attack vectors may then be activated such that access to the objects placed in the "honey pot" can be monitored. The behavioral analysis and machine learning are based on the monitoring of the events as the attack vectors interact with objects placed in the "honey pot." The precision of the detection algorithm is improved by gathering events triggered during the interaction with the honey pot and analyzing outcomes. For example, the probability of a false positive may be reduced.

In one aspect, the honey pot may be specifically designed to increase the chance of triggering an event. For example, a given honey pot may be designed to increase the chance of triggering an event related to identity theft.

In one aspect, the analysis for detection of malwares may be performed statically or dynamically. Static analysis refers to an analysis of software codes or binary executables without an execution. Dynamic analysis refers to an analysis that performs the execution of the software codes or binary. Therefore, the analysis tool for detecting the malwares may be a static analysis tool or a dynamic analysis tool.

A dynamic analysis tool may comprise a light dynamic analysis tool and/or a deep dynamic analysis tool. A light dynamic analysis tool is an analysis tool with low resource consumption, without invasive techniques that may interfere with software installed on a device, and with low performance impact on the device. The low resource consumption enables the light dynamic analysis tool to be implemented on an endpoint device.

A deep dynamic analysis tool is a malware detection tool with high resource consumption and may involve invasive techniques, e.g., hooking, patching, injection, and the like. For example, activities such as monitoring consume a lot of resources and use invasive techniques. Thus, it may be preferable to include such techniques only in the deep dynamic analysis tool. The deep dynamic analysis tool is designed to be launched in one or more computers of a testing environment, e.g., a computer in a laboratory setting, a computer in a data center that doesn't include real data. In other words, test computers can be infected with a malware without the risk of real data (user data) being leaked or lost. Unlike the light dynamic analysis tool, if a deep dynamic analysis tool is launched on an endpoint device, the user may experience degradation of performance, e.g., delays, software failures, etc.

The laboratory setting is also referred to as a "sandbox" and includes a hardware and software system in a testing environment for isolating untrusted software, i.e., untrusted codes. In the present disclosure, the sandbox is intended to be used for execution of suspicious samples (suspicious codes). The suspicious samples may eventually be identified either as malware or a clean code. The sandbox includes a controller connected to a cloud based network transport mechanism. The hardware system of the sandbox consists test servers intended for execution of suspicious samples in a pre-configured environment under control and with safety measures. In this scenario "safety" implies that, even in the case of the test server being infected by a malware during execution of the suspicious sample, the test server can be redeployed in a clean state via an automatic hardware reboot from the control infrastructure. Moreover, the redeployment occurs without spreading the infection. For example, the controller may include an internet/intranet filter for preventing or limiting the spread of malware. The test servers are deployed and redeployed in predefined configurations of typical desktop environments that are monitored by a deep dynamic analysis tool.

The cloud based network transport mechanism is used for sending the suspicious samples for execution in the sandbox, receiving verdicts from the sandbox, and updating malware detection modules in light and deep dynamic analysis tools. The cloud based network transport mechanism may be referred to as a "CloudBrain" and includes Application Programming Interfaces (APIs) for sending the samples and receiving the verdicts. Some components of the CloudBrain include Pre-boot Execution Environment (PXE) servers, backup/restore agents, development and operation (devop) systems and scripts, file servers, firewalls, etc.

An event detected by a malware detection tool may be of "Type A" or "Type B." Type A event refers to an event that can be collected by an external monitoring tool. Some examples of Type A events are file operations, registry operations, thread creation, process creation, etc. Type A events are collected by both endpoint devices and test servers. However, collection of Type A events does not require invasive techniques. As such, the Type A events are collected without impacting the performance of the device while the collection is transparent to the software under monitoring. In other words, the code being monitored is unaware of the fact that Type A events are being detected. Type B event refers to an event detected inside a monitoring process using invasive techniques. The Type B events are detected via a deep dynamic analysis tool, e.g., by monitoring events on a test server of a sandbox. Collecting Type B event is resource intensive and may lead to performance degradation.

Events of Types A and B may be gathered on demand, periodically, etc., based on the application. When events of the same type are received periodically, the number of events collected in a given time unit is referred to as a logging frequency. For example, the analysis of the deep dynamic analysis tool in the sandbox may be run hourly to gather events of Type B. Then, the logging frequency for the Type B event may be provided as the number of Type B events per hour. Examples of events of Type A include at least one of: guaranteed events, logging or tracing events, and noninvasive monitoring events are described below. Examples of events of Type B include at least one of: events based on virtualization technologies, and events based on modification of system components are described below.

Examples of Events of Type A

Guaranteed events are event that are collected via subscription mechanisms in Operating Systems (OSs) that allow registering callback to receive notifications when an event occurs. The subscribers specifies or selects which type of events should be included in notifications. In general, receiving and processing guaranteed event leads to minimal additional workload for the subscribing endpoint device. Therefore, the resource consumption is generally not a concern. Some examples of events for a Windows OS to which a device may subscribe include the events shown in Table-1, below.

TABLE 1

Call back registration Functions and Guaranteed Events

| Callback registration function | Guaranteed event |
| --- | --- |
| PsSetCreateThreadNotifyRoutine<br>PsSetCreateThreadNotifyRoutineEx<br>PsSetCreateProcessNotifyRoutine<br>PsSetCreateProcessNotifyRoutineEx<br>PsSetCreateProcessNotifyRoutineEx2 | Creation/termination of threads (units of code execution) and processes (memory address space containers) |
| PsSetLoadImageNotifyRoutine<br>PsSetLoadImageNotifyRoutineEx | Loading/unloading of executable binaries (.exe, .dll, .sys) |
| ObRegisterCallbacks with OB_OPERATION_REGISTRATION structures describing pre and post operation callbacks for OS objects (threads, processes and desktops currently in Windows 10) | Attempt to accessing OS primitives (objects)-creating, opening, inheriting or duplicating. |
| File System Filters (IRP Dispatch Callbacks)<br>File System Mini-filters (FltRegisterFilter) | File system operations |
| NDIS Filters | All network transfer operations, especially for TCP/IP protocol |
| CmRegisterCallback<br>CmRegisterCallbackEx | System registry operations |

Logging and tracing events include events of modern OSs with mechanisms for gathering and analyzing various statistics and logs by applications of the operating system. Enabling these mechanisms leads may have some performance impact and resource consumption, the impact being dependence on a frequency with which the events are gathered. For example, in Windows OSs, enabling the mechanism consists: enabling Windows Event Logs, Performance Counters, Event Tracing for Windows (ETW) logs, and Windows Management Instrumentation (WMI) Subsystems.

Noninvasive monitoring events are events collected by monitoring tools that can independently monitor processes and threads by: temporarily suspending application, resuming suspended applications, accessing memory associated with the suspended and resumed applications, and analyzing code and data flows of the processes and threads being monitored. Some techniques used by noninvasive monitors include stack trace analysis, detection of injections based on checking memory regions access rights to execute code, analysis of code and data flow based on modern Central Processing Unit (CPU) logging and tracing abilities, and the like. When compared to the guaranteed and the logging and tracing events, the noninvasive monitoring events create larger but acceptable workload and performance impact.

In order to mitigate the increase in resource consumption at endpoint device and stay within acceptable levels, the present disclosure sets a frequency of event logging and a depth of the analysis for the noninvasive monitoring in accordance with a level of trust associated with the process or thread. Initially, a default logging frequency and a default depth of analysis is established. If the process is trusted (e.g., digitally signed by a trusted publisher), the frequency of event logging and the depth of analysis for process are adjusted lower. In contrast, if the process is untrusted, the frequency and depth of analysis are adjusted higher.

It is noted that the level of trust may change during execution. For example, an evidence of injection of an unknown code may be found during a stack trace analysis, an evidence of a code being patched in memory compared to an original disk image is revealed during data/memory integrity check, and so on. Then, the level of trust is lowered, the frequency of logging events is increased, and the depth of analysis is increased.

Examples of Events of Type B

Events based on virtualization technologies are events gathered while the system (e.g., the system of a server in a sandbox that is configured to imitate an endpoint device) is under control of a hypervisor that can provide additional events from the microprocessor. For example, the additional events may be gathered from one or more of: additional level of memory access control and protection, detection of execution of semi privileged instructions, additional cloaking abilities to hide analytical tools at root level inside hypervisor (outside of what is visible to OS and applications), and the like. This type of monitoring requires very careful emulation and leads to significant (30-50%) performance degradation. The user of the endpoint device typically does not want to convert the physical system into a virtual machine. Hence, such an environment is commonly considered invasive. However, if the endpoint device itself is a virtual machine, the user already selects a hypervisor vendor. But, a specific or custom hypervisor for the virtualization techniques may be needed.

Events based on modification of system components are events gathered in a testing environment, e.g., by replacing any desired system executable with a custom implementation. In one example, this may be accomplished using debug versions of vendor binaries. In another example, the replacement may be a full custom reimplementation of some APIs. Another approach is to use original binary components and patch a component's function in memory to transfer code flow execution to a "hook" in additional loaded library. In one aspect, missing callback capability may be incorporated to some of the APIs similar to the ones described above for the guaranteed and the logging and tracing events.

It is noted that the patching and hooking requires cloaking to hide changes from malware. For example, the malware may detect the patching and hooking when performing code integrity check or an inter-module code transfer. Patching and hooking are often counted as suspicious activities by antivirus software. Endpoint devices typically run antivirus software; hence patching and hooking are not suitable for such devices.

Returning to the malware detection, the method of the present disclosure performs the malware detection by performing the light dynamic analysis on the endpoint device, the deep dynamic analysis in the sandbox, and the correlation in the correlator, the correlator including a machine learning component and/or an expert system component. The light dynamic analysis tool of the endpoint device generates monitoring events of type A and preliminary verdicts that indicate whether a behavior associated with a sample code is malicious, suspicious, or clean. If the verdict indicates that the behavior associated with the sample code is suspicious, the sample code is sent to a deep dynamic analysis tool of a sandbox. Then, the deep dynamic analysis tool analyzes the sample code, generates events of type A and events of type B, and provides a final verdict as to the behavior of the sample code. The final verdict indicates whether the behavior associated with the sample code is malicious or clean. Then, the events of Type A, the events of Type B and the verdicts are provided to the correlator.

In one aspect, the correlator is configured to: automatically correlate the events of type A with events of type B, continuously learn from the correlation of the detected events, and provide improvements to the light and deep dynamic analysis tools—thereby enabling continuous improvement in malware detection. In other words, detection modules in the light and deep dynamic analysis tools are updated based on the correlation analysis between events of types A and B, by the correlator. As more event and verdict data is fed to the correlator by the various test servers in the sandbox, the detection algorithm is improved. The correlator updates the databases of hashes, malware signatures, and patterns of events (e.g., events of Type A) that are likely to be indicative of a malware behavior. The updated databases are used by the endpoint devices and the servers in the sandbox.

It is noted that the updates are not just for the endpoint device that had forwarded the sample for analysis in the sandbox. Rather, the updates are distributed to all the servers in the sandbox as well as to other endpoint devices. Thus, similar subsequent threats may be detected by static light analysis at the endpoint devices. The feedback from the correlator is vital for reducing a number of events needing a deep analysis in the sandbox.

As more and more of the malwares and patterns having a malware behavior are detected at the endpoint devices, it is necessary to reduce the number of false positives as well as to dispense the samples appropriately. The method of the present disclosure includes a mechanism for handling the samples and processes of when such malwares or patterns are detected. First, when an endpoint device does not detect a malware but detects a suspicious pattern, a preliminary verdict is issued declaring the process as a "suspicious" process. Then, the process is temporarily suspended and the sample is sent to the sandbox for deep analysis and a final verdict. When a final verdict received from the sandbox indicates that the process is a malware, the process is terminated and the sample is quarantined. When the final verdict indicates that the process is clean, the process is allowed to resume, i.e., the suspension is lifted. The current approach for dispensing suspicious samples appropriately reduces the significant of a false positive at the endpoint; false positives create temporary suspensions and not terminations of processes. The methods of the endpoint device, the server in the sandbox, and the correlator are described in conjunction with FIGS. 4-6.

Figure 2:
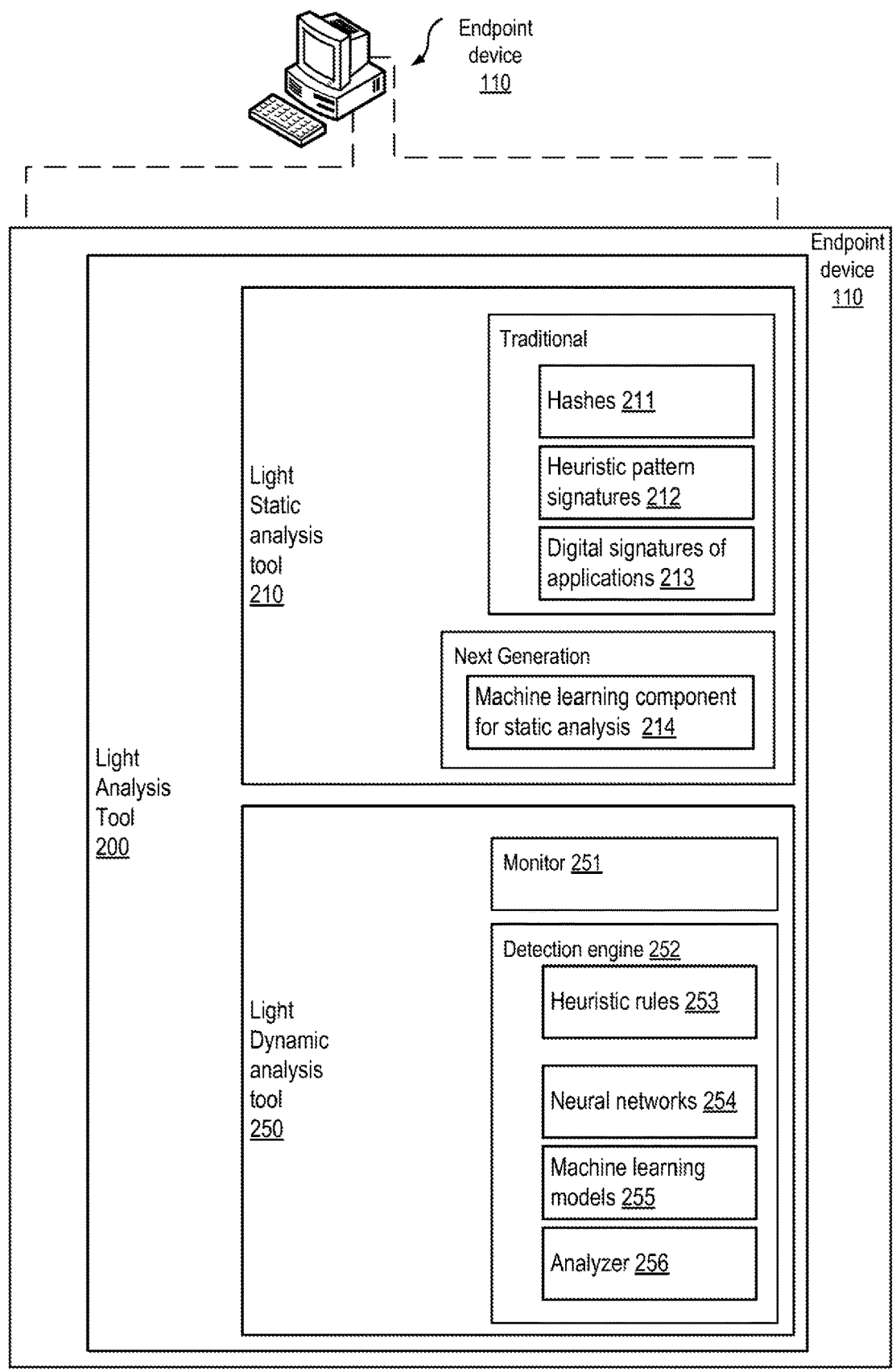
FIG. 2 is a block diagram illustrating an exemplary endpoint device for detecting malwares in accordance with aspects of the present disclosure.

FIG. 2 is a block diagram illustrating an exemplary endpoint device 110 for detecting malwares in accordance with aspects of the present disclosure. The endpoint device 110 comprises a cybersecurity product that includes a light analysis tool 200 for monitoring processes on the endpoint device and collecting Type A events. The light analysis tool may comprise a static light analysis tool 210 and/or a dynamic light analysis tool 250.

The static light analysis tool 210 detects malwares based on traditional or next generation detection models by checking the sample against known hashes and malware signatures. The traditional detection model is based on one or more of: hashes 211, heuristic pattern signatures 212, and digital signatures of applications 213. The next generation detection model is based of machine learning component 214 for static analysis, i.e., based on feedback received from a correlator.

For the next-generation approach, machine learning is used to continuously train the tool based on previous events and final verdicts, thereby reducing the amount of deep dynamic analysis to be performed. For example, when a new threat is discovered for one endpoint device using the method of the present disclosure, after the update is performed for one or more endpoint devices, subsequent threats to any of the one or more endpoint devices are discovered via the static analysis tool of the respective endpoint device, i.e., without requiring another deep dynamic analysis on a server of the sandbox.

The dynamic light analysis tool 250 comprises a monitor 251 for events of Type A and a detection engine 252. The detection engine 252 includes one or more of: heuristic rules 253 received from a secure analyst, a neural network 254 (trained neural network), machine learning models 255, and an analyzer 256. The event monitor 251 gathers events of Type A in accordance with a selected logging frequency that depends on a level of trust. The level of trust for a process may depend on a presence of a digital signature of a trusted publisher, an evidence of external injections, an evidence of external plug-ins, and so on. In one example, the level of trust may be indicated in accordance with labels selected by the user of the endpoint device. For example, the labels may be "A+", "A", "A−" to indicate a level of trust. Then, based on the level of trust assigned to a process, a frequency and amount of monitoring the process may be adjusted.

Figure 3:
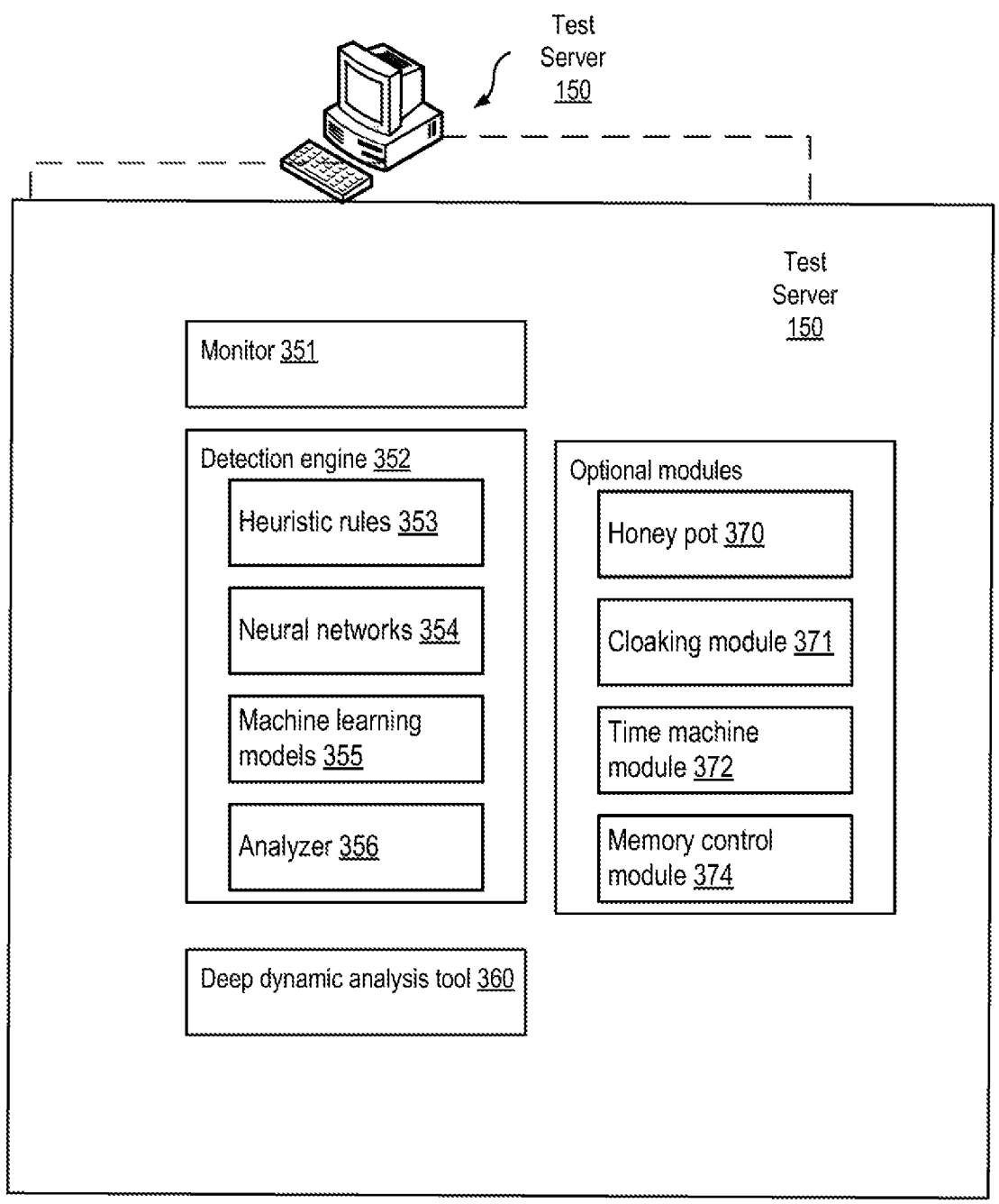
FIG. 3 is a block diagram illustrating an exemplary test server of a sandbox used for detecting malwares in accordance with aspects of the present disclosure.

FIG. 3 is a block diagram illustrating an exemplary test server 150 of a sandbox used for detecting malwares in accordance with aspects of the present disclosure.

The test server 150 comprises all the elements of the light dynamic analysis tool described for the endpoint point device as well as a deep dynamic analysis tool. Namely, test server 150 comprises a monitor 351 for monitoring events of Type A, a detection engine 352, a deep dynamic analysis tool 360. The deep dynamic analysis tool 360 may also be referred to as a toolchain, and the tool is used to collect events of Type B. The detection engine 352 includes one or more of: heuristic rules 353 received from a secure analyst, a neural network 354, machine learning models 355, and an analyzer 356. The analyzer 356 issues the final verdicts based on the analysis of the received events of Type B in accordance with applicable detection models. In one aspect, the test server 150 may also include one or more optional modules such as: a honey pot 370, a cloaking module 371, a time machine module 372, and a memory control module 373.

In one aspect, the honey pot 370 is used to increase the chance of triggering a malware attack. Malwares may then be detected by monitoring when access to objects placed in the "honey pot" occurs. The deep dynamic analysis tool may then be able to determine how the attack vectors operate on data and/or files.

In one aspect, the cloaking module 371 is used for disguising the execution from the sample (sample code) under analysis. Artifacts of invasive techniques are hidden from the sample.

In one aspect, the time machine module 372 is used for managing time flow for the sample under analysis and to accelerate or slow down the time. In one example, an attack based on time (also referred to as a time bomb) may be revealed. In another example, a performance degradation that would result after an attack may be revealed by accelerating the time.

In one aspect, the memory control module 373 is used to control address space, maintain memory map, and manage access to memory pages associated with the memory map. The memory control module 373 controls the execution of the sample under analysis and monitors the execution to determine modifications due to the execution. When cloaking is implemented, the memory control module 373 also cloaks modifications made to the memory pages from the sample under analysis.

In one aspect, one or more of the optional modules 370-373 are included in the deep dynamic analysis tool. In another aspect, the optional modules 370-373 are included in the test server and the deep dynamic analysis tool employs the optional module as needed. In another aspect, the optional modules may be installed on another server with which the test server is communicatively coupled. In other words, the various elements used during the deep dynamic analysis may be installed on different or the same devices that are included as part of the sandbox infrastructure.

FIG. 4A illustrates steps 402-427 of a flow diagram of a method 400 for detecting malwares by an endpoint device in accordance with aspects of the present disclosure. FIG. 4B illustrates steps 430-480 of a method 400 for detecting malwares by an endpoint device in accordance with aspects of the present disclosure. The method 400 may be carried out with the aid of the system described in FIGS. 1-3 and 7. Method 400 starts in step 402 and proceeds to step 405. In other words, for the method 400, steps 402, 405, 410, 412, 420, 422, 425 and 427 are shown in FIG. 4A and steps 430, 433, 440, 445, 450, 451, 460, 470, 475 and 480 are shown in FIG. 4B.

In step 405, a light analysis tool of an endpoint device, e.g., endpoint device 110, receives a sample of a process being monitored.

In step 410, the light analysis tool performs a light static analysis. For the static analysis, the sample is not executed. Rather, the static analysis is based on one or more of: hash comparisons, signature comparisons, checking digital signatures (e.g., for traditional approaches), and predictions using machine learning models (e.g., for next-generation approaches).

In step 412, the light analysis tool determines whether the process is a malware based on the light static analysis. If the process is determined as being a malware, the method proceeds to step 460. Otherwise, the method proceeds to optional step 420.

In optional step 420, the method accepts the sample for execution and sets a level of trust for the sample. The method proceeds to optional step 422. In one aspect, the level of trust is set based on a presence of a digital signature of a trusted publisher, an evidence of external injections, an evidence of external plug-ins, and so on.

In optional step 422, the method determines whether a launch of the sample is based on the set level of trust. If the launch is based on the set level of trust, the method proceeds to optional step 425. Otherwise, the method proceeds to step 440.

In optional step 425, the method determines whether the set level of trust for the sample requires an approval prior to launching the sample. For example, the criteria may be predefined by the user indicating when an approval is needed. For instance, the approval may be needed only when the level of trust is below a certain level. If the set level of trust requires an approval prior to launching, the method proceeds to optional step 427. Otherwise, the method proceeds to step 440.

In optional step 427, the method sends a request to a user, the request being for an approval to launch the process. The method then proceeds to optional step 430.

In optional step 430, the method determines whether the approval is received. If the approval is received, the method proceeds to optional step 433. Otherwise, the method returns to step 405. For example, if the request for an approval is denied, the method proceeds to step 405. In contrast, if the request is granted, the method proceeds to optional step 433.

In optional step 433, the method adjusts the level of trust in accordance with the approval. For example, if the user specifically indicates that the process is genuine and not associated with a malware, the level of trust may be increased. The method then proceeds to step 440.

In step 440, the light analysis tool determines whether the process is a malware or suspicious pattern based on a light dynamic analysis, wherein the light dynamic analysis comprises: collecting events of Type A without invasive techniques, analyzing the collected events of Type A to determine if the process is a malware, a suspicious pattern or clean. If the process is determined as being a malware, the method proceeds to step 460. If the process is determined as being suspicious pattern, the method proceeds to step 445. If the process is determined as being clean, the method proceeds to step 475.

In one aspect, the analysis for detecting the malware or suspicious pattern are based on heuristic rules or predictions using machine learning models (i.e., using a detection engine of the light analysis tool). The heuristic rules are used for detecting malwares unconditionally. In contrast, the prediction is for detecting suspicious patterns probabilistically based on a predefined threshold. That is, suspicious patterns that are highly likely to be malwares may be identified probabilistically. The samples associated with the suspicious patterns are to be sent to the sandbox for final verdict. That is, after the light dynamic analysis is used for a correlation analysis within the endpoint device, a preliminary verdict is made and the sample is sent to the sandbox for the final verdict.

In one aspect, the predefined threshold is set based on an acceptable value of a false positive. For instance, the threshold may be set such that 95% of initial verdicts (preliminary verdicts) by the light analysis tool match their respective final verdicts.

In one aspect, the light dynamic analysis further comprises adjusting the set level of trust. For example, when a suspicious pattern is detected during the collection and analysis of events of Type A, an amount of frequency of event gathering and the depth of analysis may be adjusted. In another example, suppose a rare but normal behavior for an application is detected, then the level of trust may be reduced. In yet another example, the process is determined as being related to an injection of a digitally signed application, then the level of trust may increase.

In one aspect, when the level of trust is adjusted to a setting below a predetermined level, a predetermined security procedure is activated. For example, all untrusted applications may be suspended during vital operations. In one example, processes with low level of trust are suspected during work with bitcoin wallet, file transfer of confidential documents, during financial transaction, during authentication of user identity, etc.

In step 445, the method suspends the process and sends the sample to a sandbox with a request for a final verdict indicating whether the process is a malware. The method then proceeds to step 450. In one aspect, the level of trust may also be adjusted. In other words, if optional steps 420 and/or 433 are implemented, the level of trust is adjusted. In contrast, if the optional steps are not implemented, the level of trust may be set in step 445.

In one aspect, the sample is sent to the sandbox in an automated manner. That is, a prompt for an approval is not needed. In another aspect, the sample is sent to the sandbox in accordance with an approval by a user. In one aspect, the approval is received as a response to a request sent to the user, wherein the request is to approve sending the sample to the sandbox for a deep dynamic analysis on a server of the sandbox.

In step 450, the method receives a final verdict from the sandbox. In step 451, the method determines whether the process is a malware based on the received final verdict. If the process is a malware, the method proceeds to step 460. Otherwise, the method proceeds to step 470.

In step 460, method terminates the process, and notifies a user of the endpoint device. In other words, the malware is effectively blocked from being executed on the endpoint device and the sample is quarantined. The method returns to step 405 to process other samples, e.g., samples of either the same or other processes.

In step 470, the method enables the process to resume in accordance with a policy, e.g., a policy set by the user. For example, if the process was suspended and the final verdict indicated that the sample is clean, the suspension is lifted. In other words, the process is temporarily suspended, i.e., until a final decision (verdict) is received. If the response indicates that the sample is not that of a malware, the suspended process is allowed to be executed. The method proceeds to step 475.

In step 475, the method executes the process. The method then proceeds either to step 480 to end the process or to step 405 to continue receiving samples.

As described above in step 445, the endpoint device sends the samples to the sandbox. In turn, a controller 140 of the sandbox receives the sample from the endpoint device through the cloud network 130. The controller 140 selects and deploys a test server of any number of test servers of the sandbox to imitate the endpoint device, i.e., the user environment. The test server is the server in the sandbox specifically setup to imitate the endpoint device. Hence, without loss of generality, the particular test server may simply be referred to as the server of the sandbox. Once the server of the sandbox is deployed imitating the user environment, the sample is loaded and launched on the deployed server in accordance with the analysis tools of the server, which include the deep dynamic analysis tool.

Figure 5:
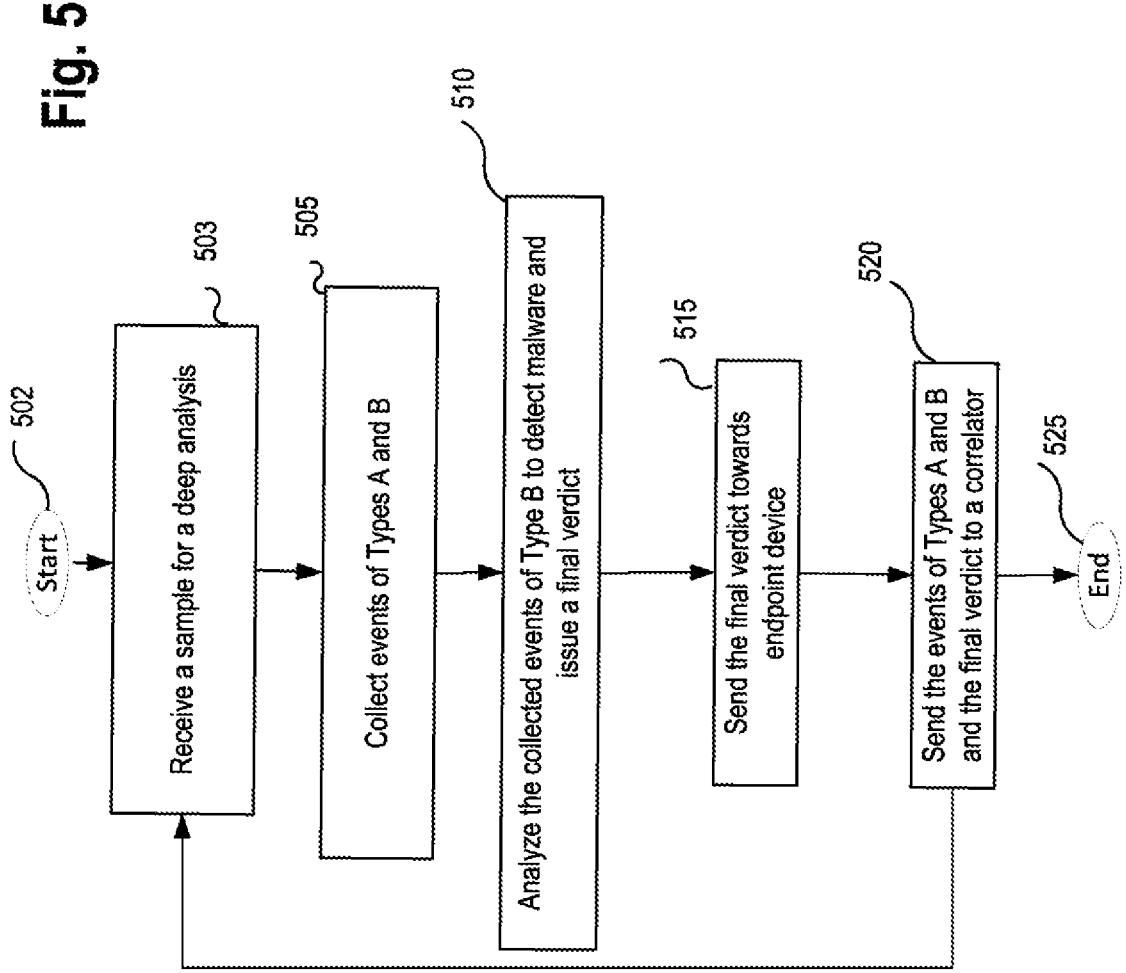
FIG. 5 is a flow diagram of a method for detecting malwares by a server of a sandbox in accordance with aspects of the present disclosure.

FIG. 5 is a flow diagram of a method 500 for detecting malwares by a server of a sandbox (test server) in accordance with aspects of the present disclosure. The method of FIG. 5 may be carried out with the aid of the system described in FIGS. 1-3 and 7. Method 500 starts in step 502 and proceeds to step 503.

In step 503, method 500 receives a sample for a deep dynamic analysis, the sample being of a process being monitored.

In step 505, method 500 of the test server (server of the sandbox) collects events of Type A and events of Type B for the received sample. It is noted that the test server has all of the analysis tools of the endpoint device plus the deep dynamic analysis tool. The events of Type B are collected via the deep dynamic analysis tool but not by the light dynamic analysis tool of the endpoint device. Therefore, the server in the sandbox is able to collect both the events of Type A and the events of Type B.

In step 510, method 500 analyzes, by a detection engine of the test server, the collected events of Type B using one or more detection models of the deep dynamic analysis tool to detect malwares and issue a final verdict. The final verdict is indicative of whether the process is a malware or clean.

In step 515, method 500 sends the final verdict to the controller of the sandbox for forwarding to the endpoint device. Accordingly, the controller receives the final verdict from the test server and forwards to the endpoint device via the cloud network. The endpoint device receives the final verdict, as described in step 450. Based on the received final verdict, the endpoint device determines whether the process is a malware. If the process is a malware, the process is terminated at the endpoint device and the user is notified. Otherwise, the process is allowed to resume in accordance with the policy of the user.

In step 520, method 500 sends the collected events of Types A and B, and the final verdict to a correlator. The method proceeds either to step 525 to end the process or to step 503 to continue processing other samples.

As described above, the events of Type A, events of Type B, and the verdicts are forwarded to the correlator by the server in the sandbox. A detection model of the correlator is improved using the event and verdict data.

Figure 6:
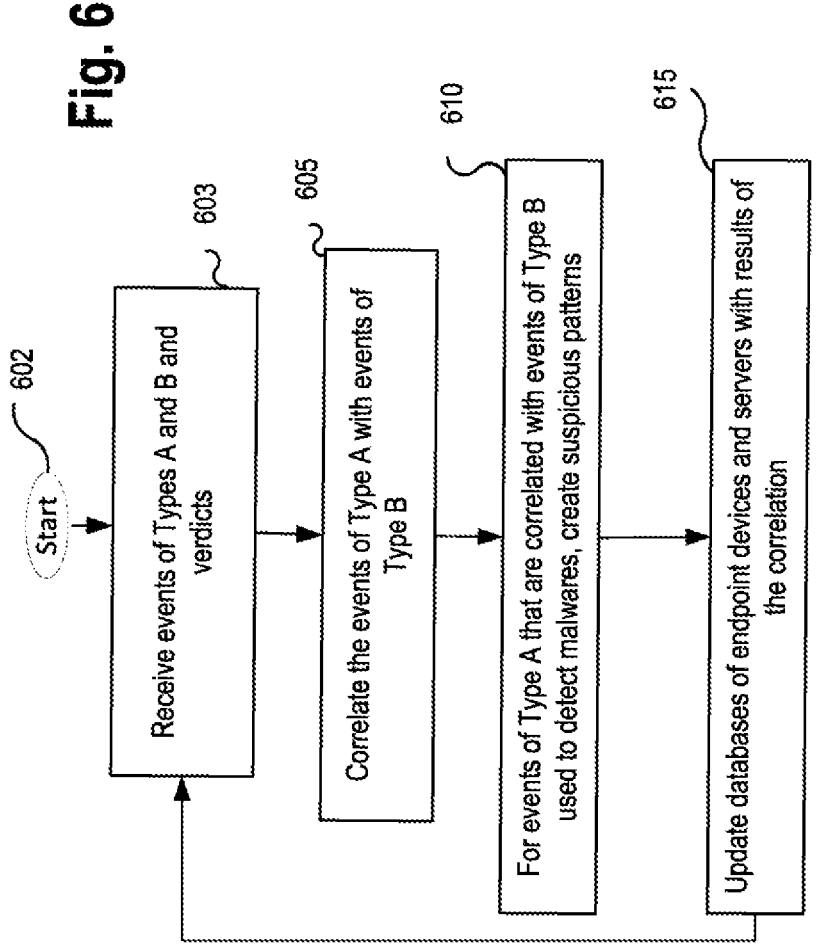
FIG. 6 is a flow diagram of a method for correlating, by a correlator, events detected by endpoint devices and servers and for updating detection modules in accordance with aspects of the present disclosure.

FIG. 6 is a flow diagram of a method 600 for correlating, by a correlator, events detected by endpoint devices and servers and for updating detection modules in accordance with aspects of the present disclosure. The method of FIG. 6 may be carried out with the aid of the system described in FIGS. 1-3 and 7. Method 600 starts in step 602 and proceeds to step 603.

In step 603, method 600 receives events of Type A, events of Type B, and verdicts. The events of Type A, events of Type B and the verdicts are received from one or more servers. In step 605, method 600 correlates the events of Type A with the events of Type B. The method determines which of the received events of Type A are correlated with events of Type B that are used to detect a malware. In step 610, for events of Type A that are correlated with events of Type B used to detect a malware, method 600 creates suspicious patterns. In step 615, method 600 updates databases of endpoint devices and servers with results of the correlation. For example, detection models in various endpoint devices are updated to include the newly created suspicious patterns. The method then proceeds to step 603 to continue receiving other events and verdicts. All of the endpoint devices using the services of the correlator benefit from the distribution of the newly created suspicious patterns. In addition, databases used by servers in the sandbox are updated. Accordingly, the correlator of the present disclosure enables a feedback mechanism for training the models within the endpoint devices. Subsequent threats from similar processes are detected by the light dynamic analysis tools in the endpoint devices.

In one aspect, the one or more servers are servers of a sandbox. In another aspect, the correlator may server a plurality of sandboxes. For example, the one or more servers may be in different sandboxes. For instance, a first controller may control a first group of servers in a first sandbox, a second controller may control a second group of servers in a second sandbox, etc. Without loss of generality, the correlator may correlate events and verdicts gathered from the servers in the plurality of sandboxes.

FIG. 7 is a block diagram illustrating an exemplary network 700 for detecting malwares by an endpoint device in accordance with aspects of the present disclosure. Note that FIG. 7 is similar to FIG. 1. For the scenario of FIG. 1, the learning module 160 operates to improve a detection model by training a neural network in an automated manner. For the scenario of FIG. 7, the learning module 160 operates by correlating events of Type A with events of Type B to create more heuristics, and feeding the created heuristics to the security analyst 160 via a human-machine interface. The learning module 160 of FIG. 1 or FIG. 7 may be trained using the events of Type A, events of Type B, and the verdicts received from the sandbox 121. In other words, the exception in FIG. 7 is that the correlator 160, as shown in FIG. 7, comprises an expert system component. However, for both scenarios, the events and verdicts are used by the correlator for improving detection methods.

The correlator then provides updates to databases of hashes, heuristic pattern signatures and digital signatures of malwares. The databases are accessible by all servers in the sandbox. Therefore, the signatures and hashes of malicious samples are used to update databases accessible by any number of servers in the sandbox. In addition, hashes, heuristic pattern signatures and digital malware signatures of endpoint devices are also updated. For example, for the endpoint device 110, the hashes 211, heuristic pattern signatures 212, and digital signatures of malware 213 are updated.

The correlation of events of Type A with events of Type B as described above enables the malwares to be detected with greater accuracy. However, events may be detected and the subsequent verdict may indicate that the detection was due to a false alarm. As such, suspicious samples may be temporarily quarantined. When a sample is quarantined, execution of processes related to the sample are suspended at the endpoint device until the deep dynamic analysis in the sandbox is completed and a verdict is received. If the verdict indicates that the quarantining of the suspicious sample was due to a false alarm, the sample is removed from the quarantine and a normal process of the sample is resumed. If the verdict indicates that the quarantined suspicious sample is malicious, the sample is destroyed and the process of the sample is terminated.

As described above, the correlation analysis is continuously updated and trained based on data on detected events of Types A and B and the corresponding verdicts. As such, the risk of infecting endpoint devices by malware is reduced.

In one aspect, the cloud-based analysis and protection of endpoint device from malwares is provided as a service to users. In one aspect, the users comprise endpoint devices of a private network, e.g., a corporate network. In another aspect, the users comprise endpoint devices that access the service via a public network. In other words, the service may be available for a mass market application. In yet another aspect, the users may comprise a hybrid of public and private network users.

Figure 8:
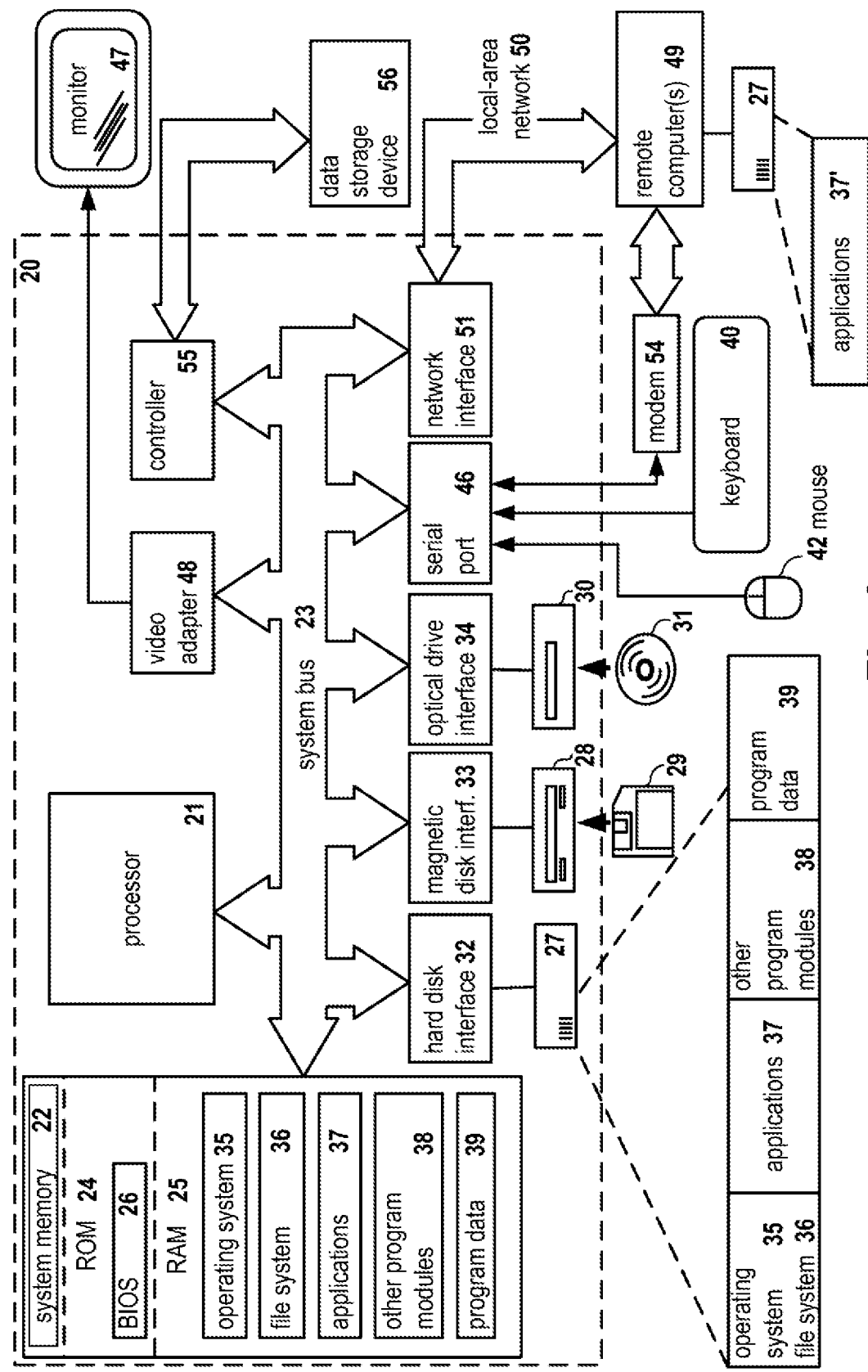
FIG. 8 presents an example of a general-purpose computer system on which aspects of the present disclosure can be implemented.

FIG. 8 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between modules of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned modules in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting an endpoint device from a malware, comprising:
   performing, by a light analysis tool of the endpoint device, a light static analysis of a received sample of a process being monitored;
   terminating the process and notifying a user when the process is determined as being the malware based on the light static analysis;
   performing, by the light analysis tool of the endpoint device, a light dynamic analysis of the received sample when the process is not determined as being the malware based on the performed light static analysis;
   when the process is determined as being clean based on the light dynamic analysis, enabling the process to execute on the endpoint device in accordance with a policy;
   when the process is determined as being the malware based on the light dynamic analysis, terminating the process and notifying the user; and
   when the process is determined as being a suspicious pattern based on the light dynamic analysis, suspending the process, setting or adjusting a level of trust for the sample, sending the sample to a sandbox with a request for a final verdict, receiving the final verdict, terminating the process and notifying the user when the process is determined as being the malware based on the received final verdict, enabling the process to resume executing on the endpoint device in accordance with the policy when the process is determined as being clean based on the received final verdict.

2. The method of claim 1, the policy being based on the level of trust, and the enabling of the process to execute on the endpoint device comprising:
   determining whether the level of trust is above a predetermined threshold;
   when the level of trust is above the predetermined threshold, executing the process; and
   when the level of trust is at or below the predetermined threshold, requesting for an approval to execute the process and executing the process only when the approval is received.

3. The method of claim 1, wherein,
   the light static analysis is performed by checking the sample against hashes and signatures of known malwares, the light dynamic analysis is performed by collecting events of Type A without invasive techniques and analyzing the collected events of Type A to determine if the process is the malware, the suspicious pattern or clean, and the determination of whether the process is the suspicious pattern is based on a preliminary verdict by a correlation analyzer of the light dynamic analysis tool.

4. The method of claim 1, wherein the light dynamic analysis comprises:
performing on-execution monitoring of collected events of Type A; and
analyzing to detect the malware or the suspicious pattern.

5. The method of claim 4, wherein the setting or adjusting reduces the level of trust for the sample when the suspicious pattern is detected, and the light dynamic analysis further comprises adjusting one or more of: a frequency of collecting the events of Type A and a depth of the light dynamic analysis based on the adjustment of the set level of trust.

6. The method of claim 1, the final verdict being determined by a deep dynamic analysis tool of a server of the sandbox by:
collecting events of Types A and B for the sample; and
analyzing the collected events of Type B using one or more detection models of the deep dynamic analysis tool to detect malwares, the final verdict being indicative of whether the process is the malware or clean based on a deep dynamic analysis of the events of Type B.

7. The method of claim 6, further comprising:
sending, by the server of the sandbox, the events of Types A and B and the final verdict to a correlator, and the correlator:
correlating the collected events of Types A and B;
for events of Type A that are correlated with events of Type B used to detect malwares, creating suspicious patterns of events of Type A; and
updating malware detection models of one or more endpoint devices and one or more servers of the sandbox based on results of the correlation, wherein the updating includes at least distributing the created suspicious patterns to the one or more endpoint devices and the one or more servers of the sandbox, the endpoint device being protected from the malwares being one of the one or more endpoint devices to which the created suspicious patterns are distributed.

8. A system for protecting an endpoint device from a malware, comprising:
at least one processor of an endpoint device configured to:
perform, by a light analysis tool of the endpoint device, a light static analysis of a received sample of a process being monitored;
terminate the process and notifying a user when the process is determined as being the malware based on the light static analysis;
perform, by the light analysis tool of the endpoint device, a light dynamic analysis of the received sample when the process is not determined as being the malware based on the performed light static analysis;
when the process is determined as being clean based on the light dynamic analysis, enable the process to execute on the endpoint device in accordance with a policy;
when the process is determined as being the malware based on the light dynamic analysis, terminate the process and notifying the user; and
when the process is determined as being a suspicious pattern based on the light dynamic analysis, suspend the process, set or adjust a level of trust for the sample, send the sample to a sandbox with a request for a final verdict, receive the final verdict, terminate the process and notify the user when the process is determined as being the malware based on the received final verdict, enable the process to resume executing on the endpoint device in accordance with the policy when the process is determined as being clean based on the received final verdict.

9. The system of claim 8, the policy being based on the level of trust, and the processor being configured to enable the process to execute on the endpoint device comprising, the processor being configured to:
determine whether the level of trust is above a predetermined threshold;
when the level of trust is above the predetermined threshold, executing the process; and
when the level of trust is at or below the predetermined threshold, requesting for an approval to execute the process and executing the process only when the approval is received.

10. The system of claim 8, wherein,
the light static analysis is performed by checking the sample against hashes and signatures of known malwares,
the light dynamic analysis is performed by collecting events of Type A without invasive techniques and analyzing the collected events of Type A to determine if the process is the malware, the suspicious pattern or clean, and
the determination of whether the process is the suspicious pattern is based on a preliminary verdict by a correlation analyzer of the light dynamic analysis tool.

11. The system of claim 8, wherein the light dynamic analysis comprises an analysis for:
performing on-execution monitoring of collected events of Type A; and
analyzing to detect the malware or the suspicious pattern.

12. The system of claim 11, wherein the setting or adjusting reduces the level of trust for the sample when the suspicious pattern is detected, and the light dynamic analysis further comprises adjusting one or more of: a frequency of collecting the events of Type A and a depth of the light dynamic analysis based on the adjustment of the set level of trust.

13. The system of claim 8, the final verdict being determined by a deep dynamic analysis tool of a processor of a server of the sandbox, the processor of the server being configured to:
collect events of Types A and B for the sample; and
analyze the collected events of Type B using one or more detection models of the deep dynamic analysis tool to detect malwares, the final verdict being indicative of whether the process is the malware or clean based on a deep dynamic analysis of the events of Type B.

14. The system of claim 13, further comprising:
the processor of the server of the sandbox, further being configured to:
send the events of Types A and B and the final verdict to a correlator, and a processor of the correlator being configured to:
correlate the collected events of Types A and B;

for events of Type A that are correlated with events of Type B used to detect malwares, create suspicious patterns of events of Type A; and update malware detection models of one or more endpoint devices and one or more servers of the sandbox based on results of the correlation, wherein the updating includes at least distributing the created suspicious patterns to the one or more endpoint devices and the one or more servers of the sandbox, the endpoint device being protected from the malwares being one of the one or more endpoint devices to which the created suspicious patterns are distributed.

15. A non-transitory computer readable medium storing thereon computer executable instructions for protecting an endpoint device from a malware, including instructions for:

performing, by a light analysis tool of the endpoint device, a light static analysis of a received sample of a process being monitored;

terminating the process and notifying a user when the process is determined as being the malware based on the light static analysis;

performing, by the light analysis tool of the endpoint device, a light dynamic analysis of the received sample when the process is not determined as being the malware based on the performed light static analysis;

when the process is determined as being clean based on the light dynamic analysis, enabling the process to execute on the endpoint device in accordance with a policy;

when the process is determined as being the malware based on the light dynamic analysis, terminating the process and notifying the user; and when the process is determined as being a suspicious pattern based on the light dynamic analysis, suspending the process, setting or adjusting a level of trust for the sample, sending the sample to a sandbox with a request for a final verdict, receiving the final verdict, terminating the process and notifying the user when the process is determined as being the malware based on the received final verdict, enabling the process to resume executing on the endpoint device in accordance with the policy when the process is determined as being clean based on the received final verdict.

16. The non-transitory computer readable medium of claim 15, the policy being based on the level of trust, the instructions for enabling of the process to execute comprising instructions for:

determining whether the level of trust is above a predetermined threshold;

when the level of trust is above the predetermined threshold, executing the process; and when the level of trust is at or below the predetermined threshold, requesting for an approval to execute the process and executing the process only when the approval is received.

17. The non-transitory computer readable medium of claim 15, wherein, the light static analysis is performed by checking the sample against hashes and signatures of known malwares, the light dynamic analysis is performed by collecting events of Type A without invasive techniques and analyzing the collected events of Type A to determine if the process is the malware, the suspicious pattern or clean, and the determination of whether the process is the suspicious pattern is based on a preliminary verdict by a correlation analyzer of the light dynamic analysis tool.

18. The non-transitory computer readable medium of claim 15, wherein the light dynamic analysis comprises performing on-execution monitoring of collected events of Type A, and analyzing to detect the malware or the suspicious pattern, the setting or adjusting reduces the level of trust for the sample when the suspicious pattern is detected, and the light dynamic analysis further comprises adjusting one or more of: a frequency of collecting the events of Type A and a depth of the light dynamic analysis based on the adjustment of the set level of trust.

19. The non-transitory computer readable medium of claim 15, wherein the final verdict is determined by a deep dynamic analysis tool of a server of the sandbox by collecting events of Types A and B for the sample; and analyzing the collected events of Type B using one or more detection models of the deep dynamic analysis tool to detect malwares, the final verdict being indicative of whether the process is the malware or clean based on a deep dynamic analysis of the events of Type B.

20. The non-transitory computer readable medium of claim 19, wherein the server of the sandbox, sends the events of Types A and B and the final verdict to a correlator, and the correlator correlating the collected events of Types A and B, for events of Type A that are correlated with events of Type B used to detect malwares, creates suspicious patterns of events of Type A, and updates malware detection models of one or more endpoint devices and one or more servers of the sandbox based on results of the correlation, wherein the updating includes at least distributing the created suspicious patterns to the one or more endpoint devices and the one or more servers of the sandbox, the endpoint device being protected from the malwares being one of the one or more endpoint devices to which the created suspicious patterns are distributed.

* * * * *